United States Patent
Dolganow et al.

(10) Patent No.: US 8,837,287 B2
(45) Date of Patent: Sep. 16, 2014

(54) APPLICATION-SPECIFIC MANAGEMENT OF HIGH-BANDWIDTH TRANSFERS

(75) Inventors: Andrew Dolganow, Ottawa (CA); John Fischer, Stittsville (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1163 days.

(21) Appl. No.: 12/423,600

(22) Filed: Apr. 14, 2009

(65) Prior Publication Data

US 2010/0260048 A1   Oct. 14, 2010

(51) Int. Cl.
*H04J 1/16* (2006.01)
*H04L 12/26* (2006.01)
*H04L 29/08* (2006.01)
*H04L 29/06* (2006.01)

(52) U.S. Cl.
CPC .............. *H04L 65/80* (2013.01); *H04L 43/028* (2013.01); *H04L 67/322* (2013.01); *H04L 43/0882* (2013.01)
USPC .......................................... 370/235; 370/233

(58) Field of Classification Search
USPC .......................... 370/229, 230, 233, 235, 329
See application file for complete search history.

(56) References Cited

U.S. PATENT DOCUMENTS

| | | | | |
|---|---|---|---|---|
| 2006/0233100 A1* | 10/2006 | Luft et al. | ...................... | 370/229 |
| 2007/0133419 A1* | 6/2007 | Segel | ............................. | 370/236 |
| 2007/0226775 A1* | 9/2007 | Andreasen et al. | ................ | 726/1 |
| 2008/0117869 A1* | 5/2008 | Freen et al. | .................... | 370/329 |
| 2010/0132031 A1* | 5/2010 | Zheng | ............................. | 726/13 |

* cited by examiner

*Primary Examiner* — Albert T Chou
(74) *Attorney, Agent, or Firm* — Kramer & Amado, P.C.

(57) ABSTRACT

Various exemplary embodiments relate to a system and related method for transmission of content over a telecommunications network. The system may include a deep packet inspection (DPI) device configured to perform DPI to identify an application associated with the new flow, determine an amount of bandwidth required for the application, and determine a current amount of bandwidth used by the subscriber. The DPI device may then determine a total amount of bandwidth used by the subscriber. When the total amount of bandwidth exceeds an amount of bandwidth guaranteed to the subscriber, the DPI device may perform a traffic management action on packets belonging to the new flow, such that the total amount of bandwidth used by the subscriber does not exceed the amount of bandwidth guaranteed to the subscriber.

20 Claims, 6 Drawing Sheets

| | Subscriber | IP Address | Current B/W | Guaranteed B/W | Guaranteed B/W (HD) | Guaranteed B/W (SD) |
|---|---|---|---|---|---|---|
| | ↑310 | ↑320 | ↑330 | ↑340 | ↑350 | ↑360 |
| 370 | John Smith | 192.1.0.5 | 6.5 mbps | 10 mbps | 7.0 mbps | 2.0 mbps |
| 380 | Sara Jones | 168.1.8.255 | 2.0 mbps | 5.0 mbps | 0 mbps | 3.0 mbps |
| 390 | ... | ... | ... | ... | ... | ... |

| | Application | Protocol | HTTP Fields | Source IP | Source Port | Estimated B/W |
|---|---|---|---|---|---|---|
| | ↑410 | ↑420 | ↑430 | ↑440 | ↑450 | ↑460 |
| 470 | HD Video | MMS | abc.com | 199.181.132.5 | 1755 | 6 mbps |
| 480 | Streaming Audio | RTSP | xmradio.com | 209.190.244.4 | 554 | 100 kbps |
| 490 | ... | ... | ... | ... | ... | ... |

APPLICATION-SPECIFIC MANAGEMENT OF HIGH-BANDWIDTH TRANSFERS

TECHNICAL FIELD

Embodiments disclosed herein relate generally to management of traffic in a telecommunications network and, more particularly, to managing transmission of high-bandwidth applications over such a network.

BACKGROUND

With the advent and expansion of broadband Internet access, end-users now have access to a larger amount of bandwidth than ever before. A typical access pipe provides a user with a bandwidth in excess of 5 megabits per second (mbps), a number that increases significantly each year. In an effort to harness this bandwidth, many content providers now offer high-quality streaming media. Users can now stream high definition (HD) video and Internet-based "radio," conduct videoconferencing, and run similar high-bandwidth applications.

The core of the service provider's network, where costly, high performance equipment is located, can accommodate a massive amount of bandwidth. A typical service provider network is therefore capable of supporting these high-bandwidth applications. As the network moves closer to the end-users, however, it necessarily becomes geographically dispersed, making it cost prohibitive to extend a large amount of bandwidth to every user. This so-called "last mile" problem is exacerbated as the number of users taking advantage of high-bandwidth applications increases.

Consider, as an example, a typical user who obtains streaming media over the Internet using a variety of devices. Such a user might stream high definition (HD) video to an Internet-enabled TV streaming box, listen to online radio using a personal computer, access Internet-enabled DVD content, stream media from/to a game console, and access media using a Wi-Fi enabled mobile handset. Furthermore, in some situations, one or more users may be accessing a number of these devices simultaneously, such that the total bandwidth required by those devices needs to be provided through a single access point.

As the number of simultaneous sessions increases, it is common for a user to experience interruptions or degradations in quality of one or more of the sessions, thereby affecting the quality of experience (QoE) of the user. For example, a user may notice audible or visible flaws in the signal, including, for example, lower quality audio or video, dropping of the signal to a lower-quality encoding, skipping, and total loss of the connection. Such problems affect the user's enjoyment of the content and increase the likelihood that the user will become dissatisfied with the service provider.

Thus, it would be desirable to implement a solution that manages the establishment and maintenance of "premium" sessions, especially those of high-bandwidth applications, such as streaming video and audio. In particular, it would be desirable to ensure that the establishment of new sessions does not negatively impact existing sessions, such that the user's QoE is not affected by overburdening of the access point. This would be particularly desirable for ensuring the QoE of existing premium sessions. Other desirable aspects will be apparent to those of skill in the art upon reading and understanding the present specification.

SUMMARY

In light of the present need for management of high-bandwidth transfers, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a system and related method for transmission of content over a telecommunications network. The system may include a communication interface that receives a plurality of packets transmitted from a content server to a device of a subscriber, the plurality of packets belonging to a new flow. The system may also include a deep packet inspection (DPI) device configured to perform DPI to identify an application associated with the new flow, determine an amount of bandwidth required for the application, and determine a current amount of bandwidth used by the subscriber.

Until one or more application flows are identified, the DPI device ensures that the "unknown" application flows, alone or in the aggregate, do not impact existing premium sessions. Once an application for a flow(s) is identified, the DPI device may then determine a total amount of bandwidth used by the subscriber, where the total amount of bandwidth used by the subscriber is equal to a sum of the amount of bandwidth required for the application and the current amount of bandwidth used by the subscriber. When the total amount of bandwidth exceeds an amount of bandwidth guaranteed to the subscriber, the DPI device may then perform a traffic management action on packets belonging to the new flows, such that the total amount of bandwidth used by the subscriber does not exceed the amount of bandwidth guaranteed to the subscriber.

It should be apparent that, in this manner, various exemplary embodiments enable a network node to monitor the establishment of new flows between a subscriber and a content server. More specifically, the network node may determine an application associated with the new flow and then determine an amount of bandwidth required for the flow. Based on these determinations, the network node may ensure that establishment of the new flow does not affect existing flows. Such an approach is advantageous, as it minimizes the burden on the service provider's network, while maintaining a high quality of experience for the subscriber.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
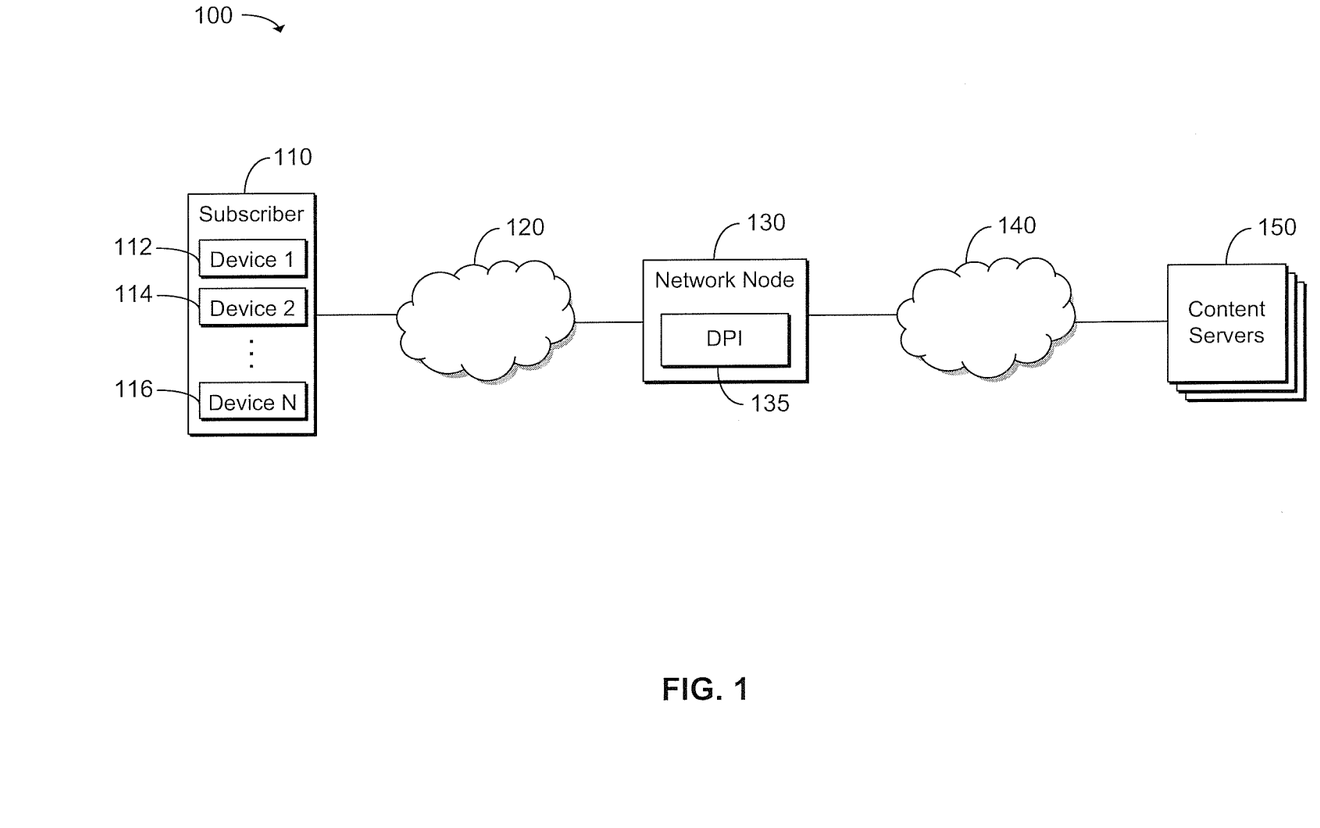
FIG. 1 is a schematic diagram of an exemplary network including a network node configured to manage the establishment of new flows.

FIG. 1 is a schematic diagram of an exemplary network 100 including a network node 130 configured to manage the establishment of new flows. Exemplary network 100 includes subscriber 110, access network 120, network node 130 including deep packet inspection (DPI) device 135, packet-switched network 140, and one or more content servers 150.

Subscriber 110 may correspond to one or more users provided with Internet access by a service provider. In particular, subscriber 110 may subscribe to an Internet service offered by the service provider with a guaranteed amount of bandwidth. As an example, a subscriber 110 could pay a monthly subscription fee in exchange for access to the Internet with a guaranteed bandwidth of 5 mbps per second and guaranteed bandwidth for premium applications. For example, the service provider could guarantee bandwidth for a predetermined number of high definition sessions and a predetermined number of standard definition sessions.

Subscriber 110 may operate a plurality of devices 112, 114, 116 that retrieve and convey content to the user. Such content may include HD video, standard definition (SD) video, streaming audio or Internet radio, feeds of a videoconference, and the like. Devices 112, 114, 116 may include any devices suitable for retrieving and conveying such content, including, but not limited to, personal or laptop computers, Internet-enabled TV streaming boxes, game consoles, and portable media players.

Access network 120 may provide an initial portion of a connection between devices 112, 114, 116 and content servers 150. In particular, access network 120 may include equipment operated by a service provider to provide a connection between subscriber 110 and network node 130. Accordingly, access network 120 may comprise a plurality of routers, switches, bridges, and other components suitable for receiving and forwarding data packets to and from devices 112, 114, 116 of subscriber 110.

Network node 130 may be an entity containing components configured to receive, process, and forward packets belonging to an Internet Protocol (IP) flow received from access network 120, such as a router or switch. As an example, network node 130 may be owned and/or operated by an Internet Service Provider (ISP) providing services to subscriber 110. Network node 130 may include a deep packet inspection (DPI) device 135.

DPI device 135 may include hardware, instructions encoded on a machine-readable medium, or a combination thereof, such that DPI device 135 may be configured to examine data packets received by network node 130 to identify information associated with the packets. In particular, DPI device 135 may examine any combination of information in Layers 2 through 7 of the Open Systems Interconnection (OSI) model in order to identify an application protocol associated with a data flow. An IP flow may be any flow between subscriber 110 and content servers 150, as identifiable by IP 5-tuple information, which includes the source IP address, source port, destination IP address, destination port, and protocol of the IP flow. This IP flow may be further tunneled inside another networking layer, such as IP, Ethernet, ATM, and the like.

It should be apparent that a number of arrangements of DPI device 135 may be used. For example, DPI device 135 may be a standalone device or may be integrated into network node 130. Other suitable arrangements will be apparent to those of skill in the art.

Packet-switched network 140 may provide a connection between network node 130 and content servers 150. Network 140 may be any network capable of sending data and requests between network node 130 and content servers 150. Accordingly, network 140 may comprise a plurality of routers, switches, bridges, and other components suitable for receiving and forwarding data packets.

Content servers 150 may be servers or content delivery networks (CDN) operated by an entity that offers streaming video, audio, or similar content, or by a service provider itself. Content servers 150 may also include another entity participating in a video conference with subscriber 110, such that the party sends subscriber 110 a stream of audio and/or video. It should be apparent, however, that the content provided by content servers 150 is not limited to streaming audio and video. Rather, any content may be provided by content servers 150 and monitored by network node 130.

Having described the components of network 100, a brief summary of the operation of network 100 will be provided. It should be apparent that the following description is intended to provide an overview of the operation of network 100 and network node 130 and is therefore a simplification in some respects. The detailed operation of network node 130 will be described in further detail below in connection with FIGS. 2-6.

In operation, according to the various exemplary embodiments, network node 130 may be configured to use deep packet inspection to identify an application associated with an IP flow to be established between subscriber 110 and one of the content servers 150. Until an application is identified, network node 130 ensures that application's flow(s) do not impact existing premium application sessions. For example, network node 130 may use traffic management actions, such as per flow/per unknown application bandwidth policing, allocation of extra bandwidth to unknown application traffic, and discarding unknown traffic ahead of premium application traffic upon congestion. When the application is identified and of interest (e.g., a premium application like streaming audio or video), network node 130 may then determine the bandwidth required for the application.

As described below in connection with FIG. 5, network node 130 may make this determination based on an estimated amount of bandwidth required for the application. For example, when the flow relates to HD video, network node 130 may assume that the IP flow will require a bandwidth of 6 mbps per second, without reference to the actual bandwidth used by the flow. Alternatively, as described below in connection with FIGS. 6A and 6B, network node 130 may make the bandwidth determination based on real-time measurement of the particular flow.

After determining the amount of bandwidth required for the flow, network node 130 may then determine whether to admit the flow based on the current amount of bandwidth used by subscriber 110 and the amount of bandwidth guaranteed to subscriber 110. When the addition of the new flow would cause the total bandwidth to exceed the guaranteed amount of bandwidth and/or exceed a guaranteed amount of BW for "premium" applications, network node 130 may take an appropriate traffic management action. For example, network node 130 may drop all packets belonging to the flow, terminate the flow, police the flow such that it does not exceed the remaining amount of bandwidth, preempt flows of lower priority to admit the flow, or perform any similar action. Alternatively, network node 130 may trigger a real-time message to subscriber 110 offering the opportunity to purchase additional bandwidth for the flow, thereby temporarily admitting the flow and allowing oversubscription.

It should be apparent that, in this manner, network node 130 may determine whether admission of a new flow would affect the existing flows of the subscriber 110, then take appropriate action based on this decision. In contrast to current implementations, this technique is based on the bandwidth required for the particular flow with reference to the underlying application and therefore increases the accuracy and effectiveness of the traffic management performed by network node 130.

Figure 2:
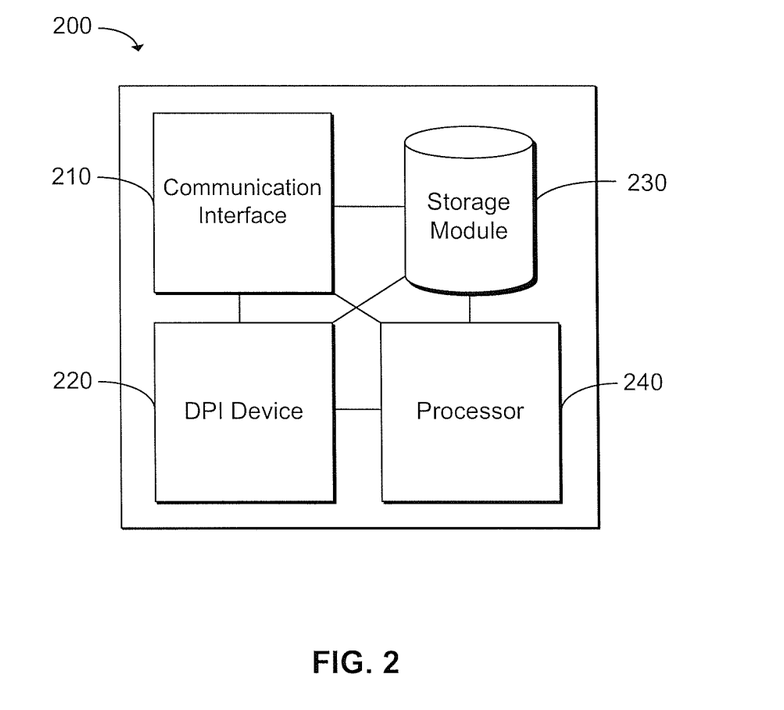
FIG. 2 is a schematic diagram of an exemplary network node for implementation in the network of FIG. 1.

FIG. 2 is a schematic diagram of an exemplary network node 200 for implementation in the network of FIG. 1. Network node 200 may correspond, for example, to network node 130 of network 100. Node 200 may include communication interface 210, DPI device 220, storage module 230, and processor 240.

Communication interface 210 may include hardware and/or executable instructions encoded on a machine-readable medium configured to receive and transmit packets over a packet-switched network. It should be apparent that the functionality of communication interface 210 may be divided into multiple components, such that the operations of receiving and transmitting packets are performed by separate components.

As described above with reference to DPI device 135 of network node 130, DPI device 220 may include hardware, executable instructions encoded on a machine-readable medium, or a combination thereof, such that DPI device 220 may be configured to examine data packets received by network node 200 to identify information associated with the packets. In particular, DPI device 135 may examine any combination of information in Layers 2 through 7 of the Open Systems Interconnection (OSI) model in order to identify an application associated with a data flow.

Storage module 230 may be a machine-readable medium storing data regarding subscribers and/or applications. For example, as described in further detail below with reference to FIG. 3, storage module 230 may maintain information regarding subscribers and the amount of bandwidth in use and guaranteed to each subscriber. As another example, as described in further detail below with reference to FIG. 4, storage module 230 may maintain information regarding applications and the amount of bandwidth used by each application.

Processor 240 may be a conventional microprocessor, a Field Programmable Gate Array (FPGA), or any other component configured to execute a series of instructions to perform any other operations necessary for the functionality of network node 200. For example, processor 240 may implement the functionality required to determine the appropriate destination of a packet to be forwarded by node 200. Other suitable functionality for execution by processor 240 will be apparent to those of skill in the art.

Figure 3:
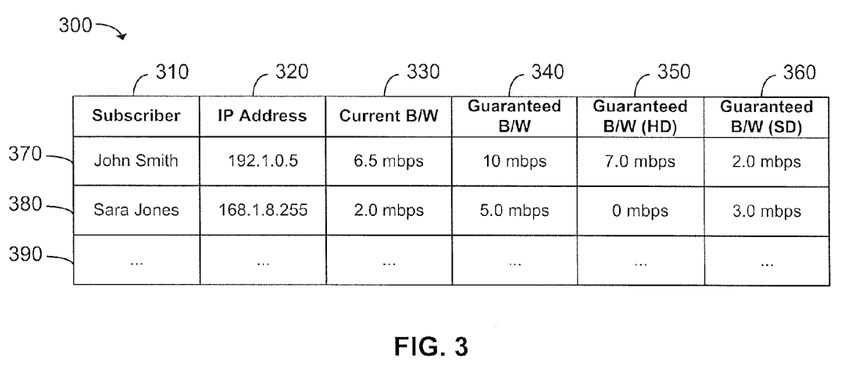
FIG. 3 is a table of an exemplary data arrangement used to maintain subscriber information.

FIG. 3 is a table of an exemplary data arrangement 300 used to maintain subscriber information. Data arrangement 300 may be, for example, a table in a database stored in storage module 230. Alternatively, data arrangement 300 could be a series of linked lists, an array, or a similar data structure. Thus, it should be apparent that data arrangement 300 is an abstraction of the underlying data; any data structure suitable for storage of this data may be used.

Data arrangement 300 may include four sets of data: a subscriber field 310; a source IP address field 320; a current bandwidth field 330; and one or more guaranteed bandwidth fields 340, 350, 360. Other fields suitable for inclusion in data arrangement 300 will be apparent to those of skill in the art. For example, data arrangement 300 could additionally include a field indicating the priority of applications relative to one another.

Subscriber field 310 may identify a subscriber 110 by name, while IP address field 320 may indicate a current IP address assigned to the subscriber 110. It should be apparent that, because IP address field 320 uniquely identifies a particular subscriber, subscriber field 310 is optional. Furthermore, it should also be apparent that, in the event a service provider allows a subscriber 110 to use multiple IP addresses, IP address field 320 may include multiple addresses. Furthermore, in systems implementing network address translation (NAT), IP address field 320 may also indicate a range of ports assigned to the particular subscriber.

Current bandwidth field 330 may indicate a combined amount of bandwidth used by all flows of a particular subscriber 110. For example, if a subscriber 110 is currently running an HD video flow of 6 mbps, an Internet radio flow of 100 kbps, and a standard definition video flow of 2 mbps, current bandwidth field 330 would contain "8.1 mbps." Upon termination of the HD video flow, current bandwidth field 330 would be updated to "2.1 mbps." It should be apparent that, in addition to current bandwidth field indicating a combined bandwidth, additional fields could be stored to indicate a combined bandwidth for a particular type of application. For example, an additional field could be included to indicate a total amount of bandwidth used for all HD video flows.

Guaranteed bandwidth field 340 may indicate an amount of bandwidth granted to the subscriber 110 by a service provider. As an example, guaranteed bandwidth field 340 may be populated based on the terms of a service level agreement (SLA) between the subscriber 110 and service provider. Guaranteed bandwidth field 350 indicates a total amount of bandwidth guaranteed to the subscriber 110 for HD video applications, while guaranteed bandwidth field 360 indicates a total amount of bandwidth guaranteed for SD video applications. It should be apparent, however, that fields 350, 360 are not limited to video applications and may include information regarding guaranteed bandwidth for any applications.

As an example, data entry 370 indicates that John Smith, located at IP address 192.1.0.5, is currently using 6.5 mbps of 10 available mbps. John Smith has a guaranteed amount of 7.0 mbps for HD video flows and 2.0 mbps for SD video flows. As another example, data entry 380 indicates that Sara Jones, located at IP address 168.1.8.255, is currently using 2 mbps of 5 available mbps. Sara Jones has a guaranteed amount of 0 mbps for HD video flows and 3.0 mbps for SD video flows. Data arrangement 300 may include numerous other data entries 390.

In some embodiments, current bandwidth field 330 and guaranteed bandwidth field 340 may be populated with a number of "credits," which may be determined based on a ratio of actual bandwidth to credits. As used herein, it should be apparent that the term, "bandwidth," encompasses such embodiments. As an example, if a ratio of 1 mbps to 10 credits were used, rather than storing 6.5 mbps, the current bandwidth field 330 of entry 350 would be populated with "65." Similarly, guaranteed bandwidth field 340 of entry 350 would be populated as "100."

Such embodiments are advantageous, particularly when an offer to purchase additional bandwidth will be made to a subscriber when additional bandwidth is required to establish a flow. As an example, the service provider may inform the subscriber that his or her plan includes 100 credits and that a particular number of credits must be purchased for the transmission to proceed, rather than using bandwidth measurements. Such embodiments therefore aid in increasing the user-friendliness of the system.

Figure 4:
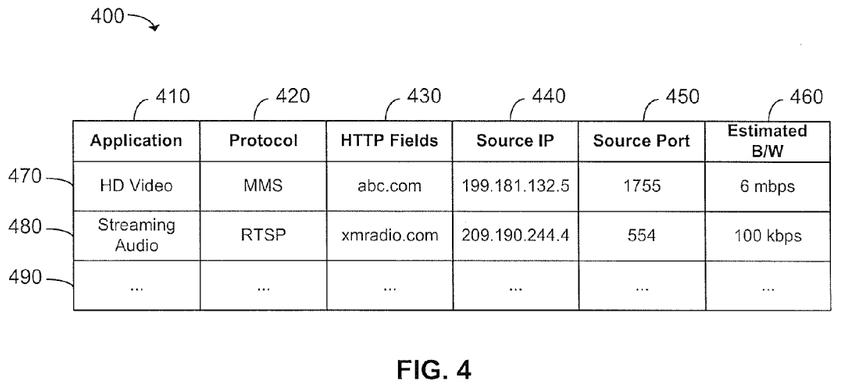
FIG. 4 is a table of an exemplary data arrangement used to maintain information regarding high-bandwidth applications.

FIG. 4 is a table of an exemplary data arrangement 400 used to maintain information regarding premium applications. Data arrangement 400 may be, for example, a table in a database stored in storage module 230. Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include six sets of data: application field 410; protocol field 420; HTTP protocol field 430; source IP 440; source port 450; and estimated bandwidth 460. Other fields suitable for inclusion in data arrangement 400 will be apparent to those of skill in the art.

Application field 410 may identify the application for which data is maintained in the row. For example, application field 410 may indicate whether the application is for video, audio, video conferencing, and the like.

Fields 420, 430, 440, and 450 may contain information that may be used by DPI device 220 in identifying the application associated with a particular flow. Thus, protocol field 420 may indicate the application-layer protocol associated with the application. HTTP protocol field 430 may indicate information required to identify a particular content and a source domain or particular website from which content of the specified type may be obtained. For example, HTTP protocol field 430 may indicate a Uniform Resource Identifier (URI), host, referrer, user agent, and the like. Similarly, source IP field 440 and source port field 450 may indicate the source IP address of the content server 150 and the source port of the content server 150, respectively.

Estimated bandwidth field 460 may indicate the bandwidth required for a typical flow of the application identified in application field 410. As described in further detail below in connection with FIG. 5, estimated bandwidth field 460 may indicate an amount of bandwidth potentially consumed by a flow without necessitating monitoring of the actual bandwidth used by a particular flow. Estimated bandwidth field 460 may be populated, for example, based on knowledge of an average amount of bandwidth used by the flow, based on a number of measured bandwidths of actual flows, or in any similar manner, as will be apparent to those of skill in the art.

As an example, data entry 470 indicates that HD video is available from abc.com (199.181.132.5:1755) through the Microsoft Media Server (MMS) protocol. HD video session flows are estimated to require 6 mbps of bandwidth per application session. As another example, data entry 480 indicates that streaming audio is available from xmradio.com (209.190.244.4:554) through the Real Time Streaming Protocol (RTSP). Such streaming audio session flows are estimated to require 100 kilobytes per second (kbps). Data arrangement 400 may include numerous other entries 490.

Figure 5:
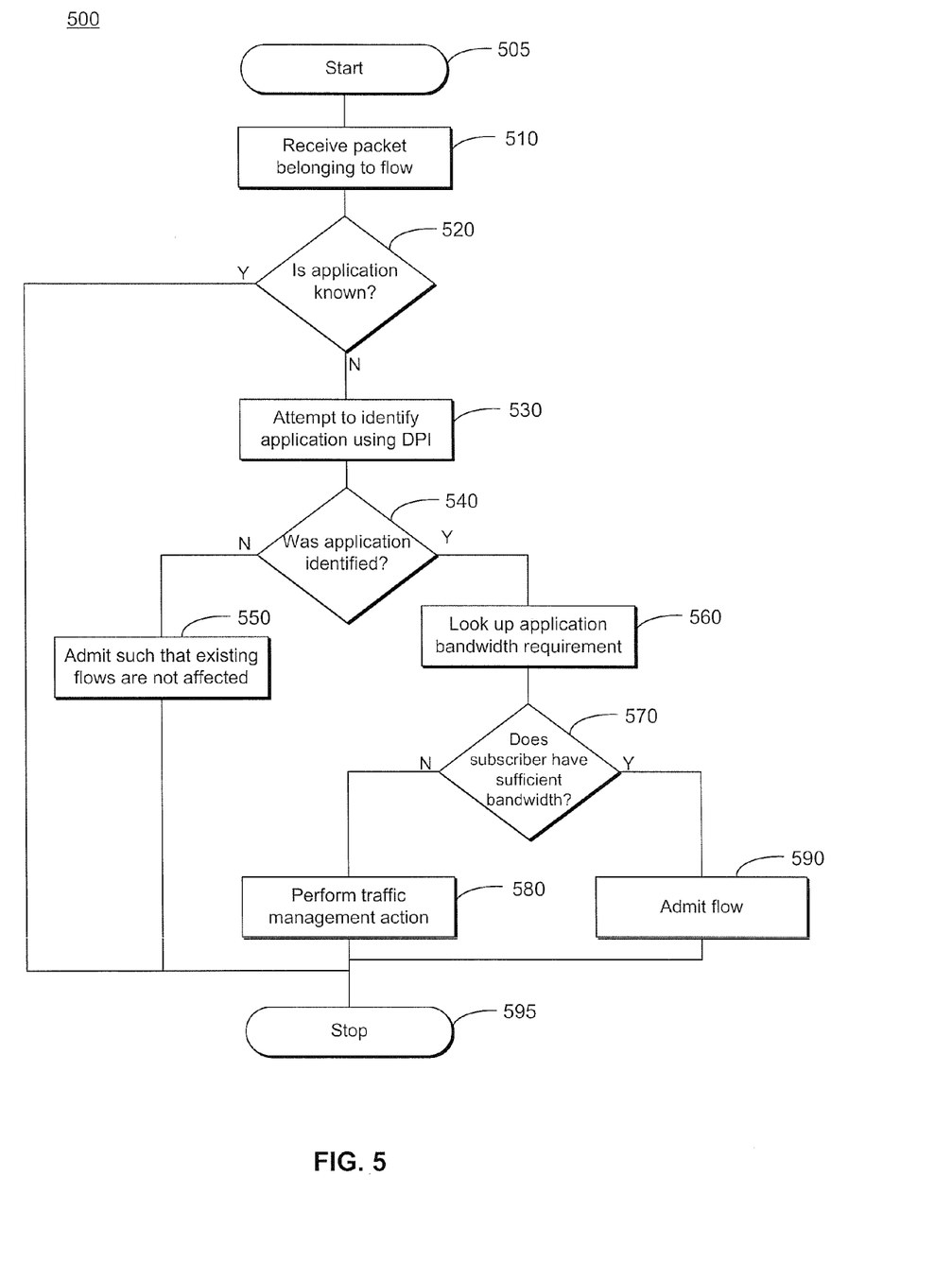
FIG. 5 is a flowchart of an exemplary method of managing transmission of content, the method using predetermined application bandwidth requirements.

FIG. 5 is a flowchart of an exemplary method 500 of managing transmission of content, the method 500 using predetermined application bandwidth requirements. Method 500 may be performed by, for example, network node 130 to manage establishment of new flows between a subscriber 110 and a content server 150.

Method 500 starts in step 505 and proceeds to step 510, where network node 130 receives a packet belonging to a flow between a content server 150 and a device 112, 114, 116 of a subscriber 110. Method 500 then proceeds to decision step 520, where it is determined whether the application associated with the flow is known.

When the application associated with the flow is already known, method 500 assumes that appropriate action has already been taken on the flow and proceeds to step 595, where method 500 stops. Alternatively, when it is determined that the application associated with the flow is unknown, method 500 proceeds to step 530.

In step 530, DPI device 135 attempts to identify the application associated with the flow using deep packet inspection (DPI). In particular, DPI device 135 may examine the IP flow using one or more packets belonging to the IP flow or any other related information, such as packets belonging to other flows.

As will be apparent to those of skill in the art, DPI device 135 may analyze any combination of information contained in OSI Layers 2 through 7 of the packets to determine an application associated with the IP flow. The analysis performed by DPI device 135 may include matching patterns and signatures across packet boundaries, performing hardware accelerated signature searches, running statistical and behavioral analysis on one or more flows, and executing hitless signature file upgrades. Other suitable techniques for identifying the application associated with the flow will be apparent to those of skill in the art.

After attempting to identify an application, method 500 then proceeds to decision step 540, where it is determined whether the application associated with the flow was successfully identified in step 530. In particular, DPI device 135 determines whether the identified application is known to network node 130. Thus, in various exemplary embodiments, DPI device 135 queries a table, database, or other mapping to determine whether the application is known to network node 130.

When, in decision step 540, it is determined that the application was not identified, method 500 proceeds to step 550. In step 550, network node 130 may admit the packet in a way that ensures existing premium application flows are not impacted. For example, node 130 may admit the packet to a best effort queue of a plurality of queues in the network node (e.g., a video queue or Internet flow queue). As another example, node 130 may temporarily oversubscribe premium application queues, while guaranteeing the bandwidth for the existing sessions (e.g., by remarking a packet to ensure preferential discard upon congestion or by increasing guaranteed BW to a subscriber until the flow is identified). Method 500 then proceeds to step 595, where method 500 stops.

Alternatively, when, in decision step 540, it is determined that the application was identified, method 500 proceeds to step 560, where network node 130 determines the bandwidth required for the application associated with the flow. As an example, network node 130 may query a storage module, which may contain a data arrangement similar to data arrangement 400 of FIG. 4, to determine an estimated amount of bandwidth required for the flow. As another example, network node 130 may extract the bandwidth requirement from one or more signaling packets used to establish or maintain the flow between content server 150 and subscriber 110.

After determining the bandwidth required for the application, method 500 proceeds to step 570, where network node 130 determines whether subscriber 110 has sufficient remaining bandwidth for the flow. In particular, network node 130 may determine a current bandwidth used by subscriber 110 by, for example, querying a storage module, which may contain a data arrangement similar to data arrangement 300 of FIG. 3. Network node 130 may then determine the total amount of bandwidth used by subscriber 110, which equals the sum of the current bandwidth used by subscriber 110 and the amount of bandwidth required for the application. In addition or as an alternative, node 130 may determine the total amount of bandwidth used by the subscriber 110 for the particular application (e.g., a total bandwidth used by all HD video flows or a total bandwidth used by all SD video flows), then compare this amount to the guaranteed bandwidth for the particular application.

When the total amount of bandwidth exceeds the amount of bandwidth guaranteed to the subscriber, in total and/or for a particular application (i.e., subscriber 110 has insufficient bandwidth), method 500 proceeds to step 580, where network node 130 performs a traffic management action on the packet and subsequent packets belonging to the flow. Any traffic management action may be used in step 580, provided that the traffic management action ensures that the total amount of bandwidth used by subscriber 110 does not exceed the guaranteed amount of bandwidth.

Thus, as an example, network node 130 may drop all packets belonging to the flow, terminate the flow between content server 150 and subscriber 110, preempt other application flows of a lower priority, and/or police an amount of bandwidth granted to the flow. As another example, network node 130 may notify the subscriber that establishment of the new flow would exceed the amount of bandwidth guaranteed to the subscriber and provide the subscriber an offer to purchase an additional amount of bandwidth sufficient to service the new flow. As described in further detail above, such an offer may be presented in terms of a number of credits required. Regardless of the traffic management action performed in step 580, after such action is performed, method 500 proceeds to step 595, where method 500 stops.

Alternatively, when, in decision step 570, subscriber 110 has sufficient bandwidth, method 500 proceeds to step 590, where network node 130 admits the flow. Network node 130 may also update the current amount of bandwidth utilized by subscriber 110 based on the bandwidth required for the flow. In addition, network node 130 may remark packets as required for Quality of Service. Methods for remarking packets in such a manner will be apparent to those of skill in the art. Method 500 then proceeds to step 595, where method 500 stops.

Figure 6A:
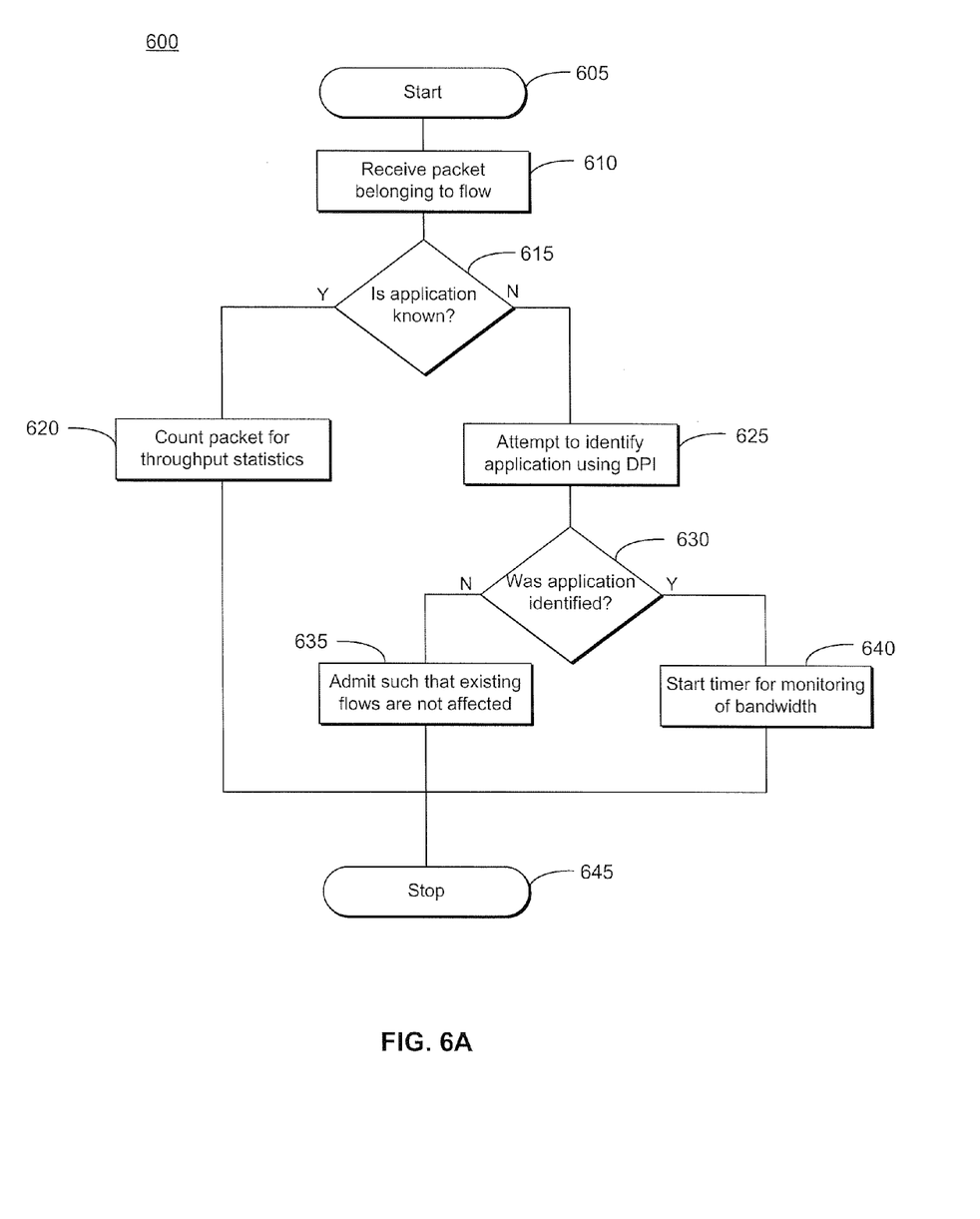
FIG. 6A is a flowchart of an exemplary method of measuring an amount of bandwidth required for an application.

FIG. 6A is a flowchart of an exemplary method 600 of measuring an amount of bandwidth required for an application. Exemplary method 600 may be performed by, for example, network node 130 to determine the actual amount of bandwidth required for a flow between a subscriber 110 and a content server 150. In particular, method 600 may be performed to determine when to start a timer for monitoring bandwidth and to maintain statistics for packets received after the timer is started.

Method 600 starts in step 605 and proceeds to step 610, where network node 130 receives a packet belonging to a flow between a content server 150 and a device 112, 114, 116 of a subscriber 110. Method 600 then proceeds to decision step 615, where it is determined whether the application associated with the flow is known.

When the application associated with the flow is already known, method 600 assumes that a timer has been started and proceeds to step 620, where network node 130 counts the packet for throughput statistics. As an example, network node 130 may determine the total number of bytes included in the packet and add this value to a running total for the flow. Other suitable statistics will be apparent to those of skill in the art. After counting the packet, method 600 proceeds to step 645, where method 600 stops.

Alternatively, when it is determined in decision step 615 that that the application associated with the flow is unknown, method 600 proceeds to step 625. In step 625, DPI device 135 attempts to identify the application associated with the flow using deep packet inspection (DPI). Further details regarding this operation are described above in connection with step 530 of FIG. 5.

After attempting to identify an application, method 600 then proceeds to decision step 630, where it is determined whether the application associated with the flow was successfully identified in step 625. In particular, DPI device 135 determines whether the identified application is known to network node 130. Thus, in various exemplary embodiments, DPI device 135 queries a table, database, or other mapping to determine whether the application is known to network node 130.

When, in decision step 630, it is determined that the application was not identified, method 600 proceeds to step 635. In step 635, network node 130 may admit the packet in a way that ensures existing premium application flows are not impacted. For example, node 130 may admit the packet to a best effort queue of a plurality of queues in the network node. As another example, node 130 may temporarily oversubscribe premium application queues, while guaranteeing the bandwidth for the existing session (e.g., by remarking a packet to ensure preferential discard upon congestion or by increasing bandwidth guaranteed to a subscriber until the flow is identified). Method 600 then proceeds to step 645, where method 600 stops.

Alternatively, when, in decision step 630, it is determined that the application was identified, method 600 proceeds to step 640, where DPI device 135 starts a timer for monitoring bandwidth. After starting the timer and prior to determining that the timer has expired, network node 130 collects statistics for all subsequent packets belonging to the flow. The timer interval during which statistics are collected may be variable and may be set by, for example, a network operator. It should be apparent that multiple timers may be used, such that a different timer is used for all flows. After starting the timer in step 640, method 600 proceeds to step 645, where method 600 stops.

Figure 6B:
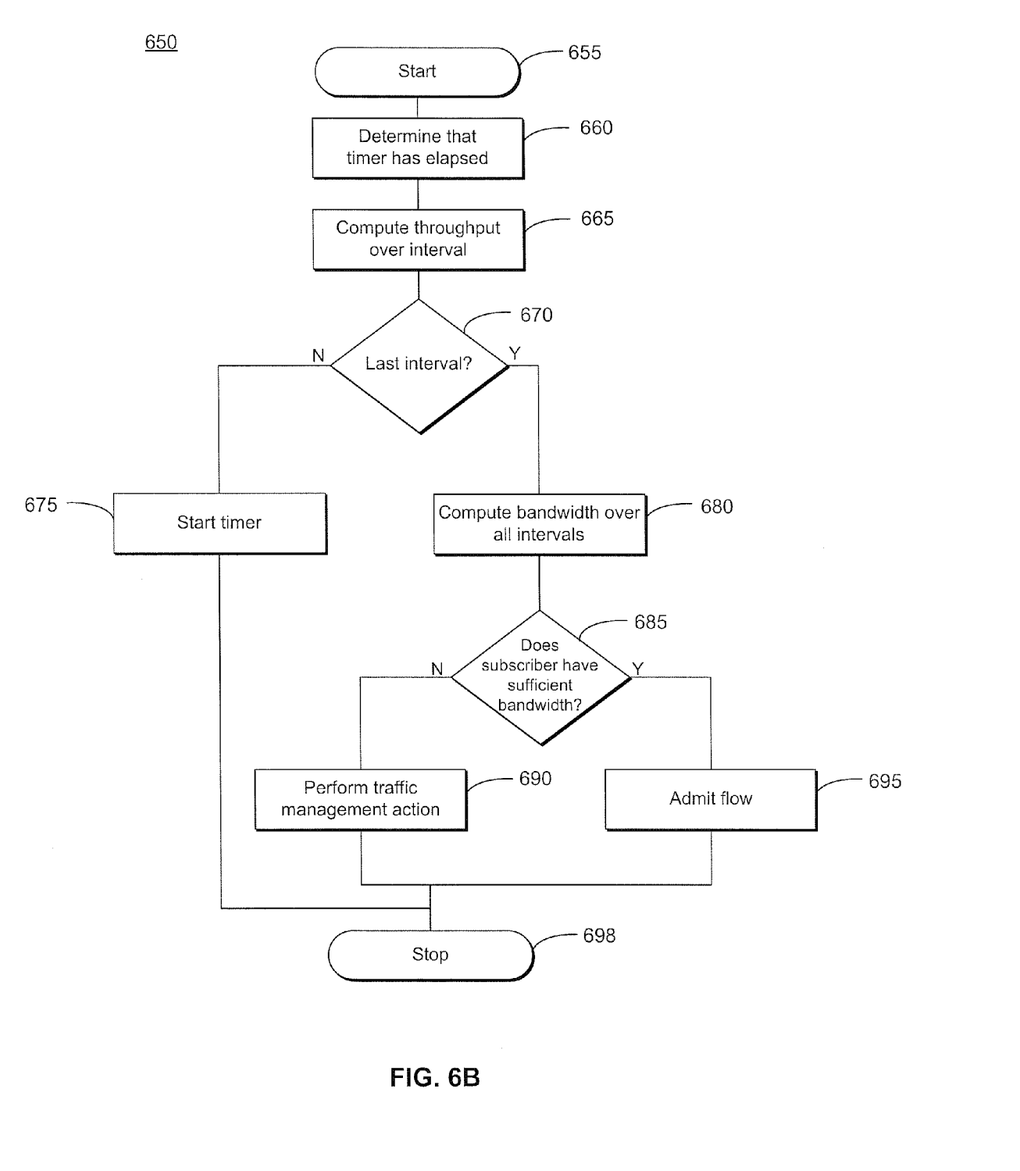
FIG. 6B is a flowchart of an exemplary method of managing transmission of content, the method using measured bandwidth requirements.

FIG. 6B is a flowchart of an exemplary method 650 of managing transmission of content, the method using measured bandwidth requirements. Exemplary method 650 may be performed by, for example, network node 130 to manage establishment of new flows between a subscriber 110 and a content server 150. In particular, method 650 may be used to calculate statistics after expiration of a timer, to determine whether additional timer intervals are necessary, and to determine whether to admit the flow based on the calculated statistics.

Method 650 starts in step 655 and proceeds to step 660, where network node 130 determines that the timer associated with a particular flow has expired. Method 650 then proceeds to step 665, where network node 130 calculates the throughput of the flow during the previous interval. In particular, based on knowledge of the duration of the timer and the total number of bytes during the interval, network node 130 may calculate the bandwidth used by the flow as, for example, a measurement of megabits per second.

Method 650 then proceeds to decision step 670, where network node 130 determines whether the previous interval was the last interval for which a bandwidth measurement is required. When the previous interval is not the last interval, method 650 proceeds to step 675, where network node 130 starts the timer for another interval. Network node 130 may then collect statistics for subsequent packets in accordance with FIG. 6A. After network node 130 starts the timer, method 650 proceeds to step 698, where method 650 stops.

Alternatively, when it is determined that the previous interval is the last interval for which a bandwidth determination is required, method 650 proceeds to step 680, where network node 130 computes a value indicating the aggregate bandwidth of all intervals. As an example, network node 130 may determine the mean, median, minimum, or maximum bandwidth based on all intervals for which network node 130 collected statistics.

After determining the bandwidth required for the application, method 650 proceeds to step 685, where DPI device 135 determines whether subscriber 110 has sufficient remaining bandwidth for the flow. In particular, DPI device 135 may determine a current bandwidth used by subscriber 110 by, for example, querying a storage module, which may contain a data arrangement similar to data arrangement 300 of FIG. 3. DPI device 135 may then determine the total amount of bandwidth used by subscriber 110, which equals the sum of the current bandwidth used by subscriber 110 and the amount of bandwidth required for the application, as determined in step 680. In addition or as an alternative, node 130 may determine the total amount of bandwidth used by the subscriber 110 for the particular application (e.g., a total bandwidth used by all HD video flows or a total bandwidth used by all SD video flows), then compare this amount to the guaranteed bandwidth for the particular application.

When the total amount of bandwidth exceeds the amount of bandwidth guaranteed to the subscriber, in total and/or for a particular application (i.e., subscriber 110 has insufficient bandwidth), method 650 proceeds to step 690, where network node 130 performs a traffic management action on the packet and subsequent packets belonging to the flow. Exemplary traffic management actions are described in further detail above in connection with step 580 of FIG. 5. After performing one or more traffic management actions, method 650 proceeds to step 698, where method 650 stops.

Alternatively, when, in decision step 685, subscriber 110 has sufficient bandwidth, method 650 proceeds to step 695, where network node 130 admits the flow. Network node 130 may also update the current amount of bandwidth utilized by subscriber 110 based on the bandwidth required for the flow. In addition, network node 130 may remark packets as required for Quality of Service. Methods for remarking packets in such a manner will be apparent to those of skill in the art. Method 650 then proceeds to step 698, where method 650 stops.

It should be apparent that, although described as performed upon establishment of a flow, the methods of FIGS. 6A and 6B may be performed to update the bandwidth requirements of a flow. In particular, because the amount of bandwidth used by a flow may vary over time, network node 130 may periodically measure the bandwidth, then select an appropriate action based on the updated bandwidth calculation. Furthermore, network node 130 and DPI device 135 may be configured to monitor for termination of the flow, such that the current amount of bandwidth used by the subscriber may be updated to reflect that the flow is no longer occupying any bandwidth.

Furthermore, although a number of the steps in methods 500, 600, and 650 are described as performed by network node 130, this functionality may be performed by any component of network node 130 or, alternatively, by a standalone device. Furthermore methods 500, 600 and 650 can be combined. Thus, the steps of these methods may be performed by, for example, DPI device 135, 220, processor 240, or a standalone DPI device or processor. Other suitable alternatives for execution of the methods will be apparent to those of skill in the art.

According to the foregoing, various exemplary embodiments allow a network node to monitor the establishment of new flows between a subscriber and a content server. More specifically, the network node may determine an application associated with the new flow and then determine an amount of bandwidth required for the flow. Based on these determinations, the network node may ensure that establishment of the new flow does not affect existing flows. Such an approach is advantageous, as it minimizes the burden on the service provider's network, while maintaining a high quality of experience for the subscriber.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A system for managing transmission of content over a telecommunications network, the system comprising:
    a communication interface that receives a plurality of packets transmitted from a content server to a device of a subscriber, the plurality of packets belonging to a new flow;
    a deep packet inspection (DPI) device configured to:
        perform DPI to identify an application associated with the new flow,
        determine an amount of bandwidth required for the application,
        determine a current amount of bandwidth used by the subscriber, the current amount of bandwidth based on flows of the subscriber other than the new flow, and
        when a total amount of bandwidth used by the subscriber, equal to a sum of the amount of bandwidth required for the application and the current amount of bandwidth used by the subscriber, exceeds an amount of bandwidth guaranteed to the subscriber, perform a traffic management action on packets belonging to the new flow, such that the total amount of bandwidth used by the subscriber does not exceed the amount of bandwidth guaranteed to the subscriber.

2. The system of claim 1, wherein:
    the current amount of bandwidth used by the subscriber is determined based solely on flows of the subscriber that also correspond to the identified application, and
    the amount of bandwidth guaranteed to the subscriber indicates bandwidth guaranteed to the subscriber for flows of the identified application.

3. The system of claim 1, further comprising:
a data storage module configured to maintain a record for the subscriber, the record indicating the amount of bandwidth guaranteed to the subscriber and the current amount of bandwidth used by the subscriber.

4. The system of claim 1, further comprising:
a data storage module configured to maintain information regarding a plurality of applications and, for each respective application, a value indicating an estimated amount of bandwidth required for each flow of the respective application, wherein:
to determine the amount of bandwidth required for the application, the DPI device is further configured to query the data storage module to retrieve the estimated amount of bandwidth required.

5. The system of claim 1, wherein, to determine the amount of bandwidth required for the application, the DPI device is further configured to:
extract the amount of bandwidth required for the application from at least one signaling packet used to establish or maintain the new flow between the content server and the device of the subscriber.

6. The system of claim 1, wherein, to determine the amount of bandwidth required for the application, the DPI device is further configured to:
monitor packets belonging to the new flow during a first time interval to determine a first flow throughput, and
calculate the amount of bandwidth required for the application as a function of the first flow throughput during the first time interval.

7. The system of claim 6, wherein the DPI device is further configured to:
update the amount of bandwidth required for the application by:
monitoring packets belonging to the new flow during a second time interval after the first time interval to determine a second flow throughput, and
calculating an updated amount of bandwidth required for the application as a function of the second flow throughput during the second time interval, and
when a sum of the updated amount of bandwidth required for the application and the current amount of bandwidth used by the subscriber exceeds an amount of bandwidth guaranteed to the subscriber, perform a traffic management action on packets belonging to the new flow, such that the total amount of bandwidth used by the subscriber does not exceed the amount of bandwidth guaranteed to the subscriber.

8. The system of claim 1, further comprising:
a plurality of queues, each queue associated with a predetermined Quality of Service (QoS), wherein:
prior to identification of the amount of bandwidth required for the application, all packets associated with the new flow are placed in a queue of the plurality of queues with a lowest QoS.

9. The system of claim 1, wherein the DPI device is further configured to:
prior to identification of the amount of bandwidth required for the application, temporarily increase the amount of bandwidth guaranteed to the subscriber.

10. The system of claim 1, wherein the traffic management action comprises at least one of dropping all packets belonging to the new flow, terminating the new flow between the content server and the device of the subscriber, preempting another flow to guarantee bandwidth for the application, and policing an amount of bandwidth granted to the new flow.

11. The system of claim 1, wherein the traffic management action comprises notifying the subscriber that establishment of the new flow would exceed the amount of bandwidth guaranteed to the subscriber and providing the subscriber an offer to purchase an additional amount of bandwidth sufficient to service the new flow.

12. The system of claim 11, wherein the offer to purchase the additional amount of bandwidth sufficient to service the new flow includes an amount of required credits, the amount of required credits calculated based on a predetermined ratio between credits and bandwidth.

13. A method for managing transmission of content over a telecommunications network, the method comprising:
receiving, in a network node, a plurality of packets transmitted from a content server to a device of a subscriber, the plurality of packets belonging to a new flow;
performing deep packet inspection (DPI) to identify an application associated with the new flow;
determining an amount of bandwidth required for the application;
determining a current amount of bandwidth used by the subscriber, the current amount of bandwidth based on flows of the subscriber other than the new flow; and
when a total amount of bandwidth used by the subscriber, equal to a sum of the amount of bandwidth required for the application and the current amount of bandwidth used by the subscriber, exceeds an amount of bandwidth guaranteed to the subscriber, performing a traffic management action on packets belonging to the new flow, such that the total amount of bandwidth used by the subscriber does not exceed the amount of bandwidth guaranteed to the subscriber.

14. The method of claim 13, wherein:
the current amount of bandwidth used by the subscriber is determined based solely on flows of the subscriber that also correspond to the identified application, and
the amount of bandwidth guaranteed to the subscriber indicates bandwidth guaranteed to the subscriber for flows of the identified application.

15. The method of claim 13, wherein the step of determining the amount of bandwidth required for the application comprises:
querying a data storage module to retrieve an estimated amount of bandwidth required for flows of the application.

16. The method of claim 13, wherein the step of determining the amount of bandwidth required for the application comprises:
monitoring packets belonging to the new flow during a first time interval to determine a first flow throughput, and
calculating the amount of bandwidth required for the application as a function of the first flow throughput during the first time interval.

17. The method of claim 13, further comprising:
prior to identification of the amount of bandwidth required for the application, placing all packets associated with the new flow in a queue in the network node with a lowest Quality of Service (QoS).

18. The method of claim 13, further comprising:
prior to identification of the amount of bandwidth required for the application, temporarily increase the amount of bandwidth guaranteed to the subscriber.

19. The method of claim 13, wherein the traffic management action comprises at least one of dropping all packets belonging to the new flow, terminating the new flow between the content server and the device of the subscriber, preempting another flow to guarantee bandwidth for the application, and policing an amount of bandwidth granted to the new flow.

20. The method of claim 13, wherein the traffic management action comprises notifying the subscriber that establishment of the new flow would exceed the amount of bandwidth guaranteed to the subscriber and providing the subscriber an offer to purchase an additional amount of bandwidth sufficient to service the new flow.

* * * * *